UNITED STATES PATENT OFFICE.

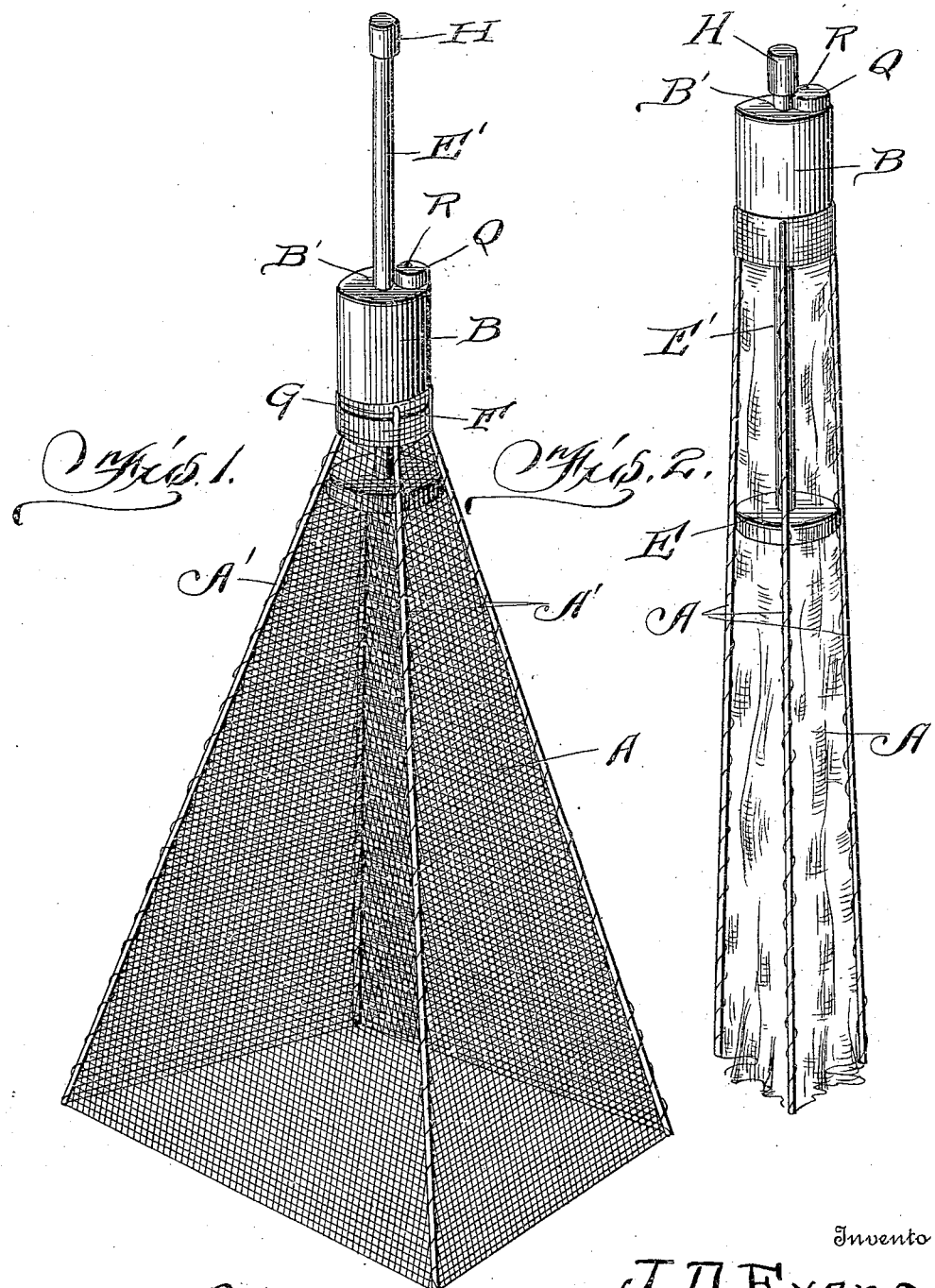

JOHN DUDLEY EVANS, OF CHESTERFIELD, SOUTH CAROLINA.

FLY-NET.

959,925.   Specification of Letters Patent.   Patented May 31, 1910.

Application filed February 23, 1910. Serial No. 545,530.

*To all whom it may concern:*

Be it known that I, JOHN D. EVANS, a citizen of the United States, residing at Chesterfield, in the county of Chesterfield and State of South Carolina, have invented certain new and useful Improvements in Fly-Nets; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fly net traps and comprises a simple and efficient device of this nature designed especially for catching house flies and comprises various details of construction, combinations and arrangements of parts which will be hereinafter fully described and then specifically defined in the appended claim.

I illustrate my invention in the accompanying drawings, in which:—

Figure 1 is a perspective view showing the trap set or opened out for use, and Fig. 2 is a similar view showing it closed.

Reference now being had to the details of the drawings by letter, A designates an umbrella shaped netting made of any suitable material, the tapering end of which is fastened to a shell B having a central longitudinal aperture B' therein. E is a disk having a stem E' fastened thereto and which is movable through the aperture in said shell. Said disk is adapted to engage wires or ribs A' forming a portion of the construction of said netting, which wires are pivotally mounted upon a ring F countersunken in an annular recess G formed in the shell. When the circumference of said disk is at its farthest limit toward the shell, the circumference of the disk is adapted to bear against said rods and hold the netting distended. A knob or handle H is formed at one end of the stem E' and affords means whereby the stem may be reciprocated, said knob serving to limit the movement of the inner throw of the stem. In order to hold said stem in its adjusted position, a cam Q is provided which is pivotally mounted upon a pin R projecting from the outer end of the shell B, said cam being adapted to be turned against the stem to frictionally engage and hold the same from movement in either direction.

The operation of the device is as follows:—When adjusted for use, the device assumes the position shown in Fig. 1 of the drawings in which the open flaring end of the netting may be placed over the flies and, after turning the cam and releasing the same from the stem, the disk at the end of the stem may be moved to the position shown in Fig. 2 of the drawings and the netting closed, as shown in Fig. 2, and, as the flies are flushed after being surrounded, they will be retained within the closed netting which may be inserted in hot water or subjected to steam of high temperature for the purpose of killing the same.

What I claim to be new is:—

A fly trap comprising a shell, wires pivotally connected thereto, a netting covering fastened about said wires and to said shell and adapted to form, when opened, a tapering inclosure, a stem movable through an opening in said shell, a disk fastened to said shell and adapted to open the netting, and means for holding said stem in different positions.

In testimony whereof I hereunto affix my signature in the presence of two witnesses.

JOHN DUDLEY EVANS.

Witnesses:
D. M. BARENTINE,
C. B. CURINGTON.